United States Patent
Wang

(10) Patent No.: US 8,208,875 B2
(45) Date of Patent: Jun. 26, 2012

(54) SYSTEMS AND METHODS FOR AUTOMATICALLY CALIBRATING OUTPUT POWER OF A COMMUNICATION DEVICE

(75) Inventor: Xiao-Dong Wang, Nanjing (CN)

(73) Assignees: Shenzhen Futaihong Precision Industry Co., Ltd., ShenZhen, Guangdong Province (CN); Chi Mei Communication Systems, Inc., Tu-Cheng, New Taipei (TW)

( * ) Notice: Subject to any disclaimer, the term of this patent is extended or adjusted under 35 U.S.C. 154(b) by 905 days.

(21) Appl. No.: 12/233,544

(22) Filed: Sep. 18, 2008

(65) Prior Publication Data
US 2009/0197547 A1    Aug. 6, 2009

(30) Foreign Application Priority Data
Feb. 1, 2008 (CN) .......................... 2008 1 0300295

(51) Int. Cl.
*H01Q 11/12* (2006.01)

(52) U.S. Cl. .................. 455/127.1; 455/127.2; 375/224; 370/343

(58) Field of Classification Search ............... 455/127.1, 455/126, 127.2, 522, 69, 91; 375/224, 297; 370/343
See application file for complete search history.

(56) References Cited

U.S. PATENT DOCUMENTS
6,374,084 B1 *   4/2002   Fok .......................... 455/67.14
2005/0159116 A1 *   7/2005   Xiong ....................... 455/127.1

OTHER PUBLICATIONS

Converting Signal Strength Percentage to dBm Values (20021217-M-WP007) Nov. 2002 WildPackets, Inc. 1340 Treat Blvd, Suite 500 Walnut Creek, CA 94597 (925)-937-3200.*

* cited by examiner

*Primary Examiner* — Nay A Maung
*Assistant Examiner* — Chung-Tien Yang
(74) *Attorney, Agent, or Firm* — Altis Law Group, Inc.

(57) ABSTRACT

A method for automatically calibrating output power from a power amplifier of a communication device is provided. The method includes acquiring present output power values corresponding to preset current power calibration values by testing, and the theoretical values from calculation corresponding to the auto-power calibrate (APC) values not obtained from testing. Using the present output power and the theoretical values, the output power values from the power amplifier under different APC values can be further calibrated automatically.

6 Claims, 3 Drawing Sheets

| APC Value | Actual Output Power Value (dBm) |
|---|---|
| 759 | 31.97 |
| 686 | 30.84 |
| 618 | 28.96 |
| 538 | 26.98 |
| 466 | 24.96 |
| 405 | 22.98 |
| 349 | 20.98 |
| 301 | 18.97 |
| 258 | 16.91 |
| 221 | 14.91 |
| 189 | 12.95 |
| 157 | 10.92 |
| 132 | 8.84 |
| 111 | 6.85 |
| 93 | 4.84 |

FIG. 1

SYSTEMS AND METHODS FOR AUTOMATICALLY CALIBRATING OUTPUT POWER OF A COMMUNICATION DEVICE

BACKGROUND

1. Field of the Invention

Embodiments of the present disclosure are related to systems and methods for calibrating power, and in particular to a system and method for automatically calibrating output power of a communication device.

2. Description of Related Art

In a wireless communication system, the distance between a communication device and a radio base station is not constantly fixed. Therefore, automatic adjustment of an output power of the communication device is necessary to maintain clear reception coverage of the radio base station and sufficient capacity of a wireless communication system according to the distance between the communication device and the radio base station.

At present, there are several major frequency bands in use by Global system for mobile communication (GSM) communication devices, such as 850 MHz, 900 MHz, 1800 MHz, and 1900 MHz bands. In each of the major frequency bands, there are 15 or 16 transmitting power classes. Furthermore, each of the transmitting power classes has corresponding auto-power calibrate (APC) values, which are not the same. Generally, every communication device has its own APC List stored in a Flash read-only-memory (Flash-ROM) to record the APC values of different transmitting power classes and corresponding actual output power values. For example, FIG. 1 shows exemplary APC values for a frequency band of GSM 900 MHz. The list records the APC values and corresponding actual output power values, measured in Decibels per milliwatt (dBm), from a power amplifier of the communication device for each of the transmitting power classes on the 900 MHz frequency band.

To accurately change the output power of the communication device at a given time, the communication device, having selected a target output power value, first searches the relevant APC list to locate native APC values corresponding to the target value, converting the values to a voltage value, and directs the power amplifier to change the output power value accordingly.

However, due to individual physical characteristics of communication devices as manufactured, actual output power values differ from the theoretical output power values corresponding to the APC list. The difference may impact capability of the power amplifier of the communication device to accurately change the output power values. Usually, in order to solve this problem, some calibration processes are applied in production line to output power values corresponding to the APC list. One example of calibration is implemented in a fashion of recursive calculations along with a logarithmic formula "Power=a+b+c*log(APC)+d/(APC$^2$)," where "Power" is the actual output power value of a power amplifier of a communication device, "APC" is one of the auto-power calibrate values in the APC list, and "a," "b,", "c", and "d" are related parameters. However, due to the non-linearity of the logarithmic formula, the recursive calculations with a logarithmic formula usually is time-consuming, and sometimes ends up in a dead loop, resulting in an unreliable solution and unproductive performance of calibration process.

Therefore, what is needed is a system and method for remedying the above-mentioned limitations.

SUMMARY

A method for automatically calibrating output power from a communication device is provided. The method includes setting several current auto-power calibration (APC) values according to an APC list of the communication device, transmitting a radio frequency (RF) signal to a power tester from a power amplifier of the communication device, testing each power value of the power amplifier via the power tester under the current preset APC values, acquiring the tested power values, determining each theoretical power value of the power amplifier under APC values in the APC list not equal to the preset current APC values, and calibrating actual power values of the APC list according to the calculated theoretical power values.

Other advantages and novel features of the present disclosure will become more apparent from the following detailed description of certain inventive embodiments when taken in conjunction with the accompanying drawings.

BRIEF DESCRIPTION OF THE DRAWINGS

FIG. 1 is a table illustrating an example of APC values and corresponding output power values of a communication device on the frequency band of GSM 900 MHz.

DETAILED DESCRIPTION OF CERTAIN INVENTIVE EMBODIMENTS

Figure 2:
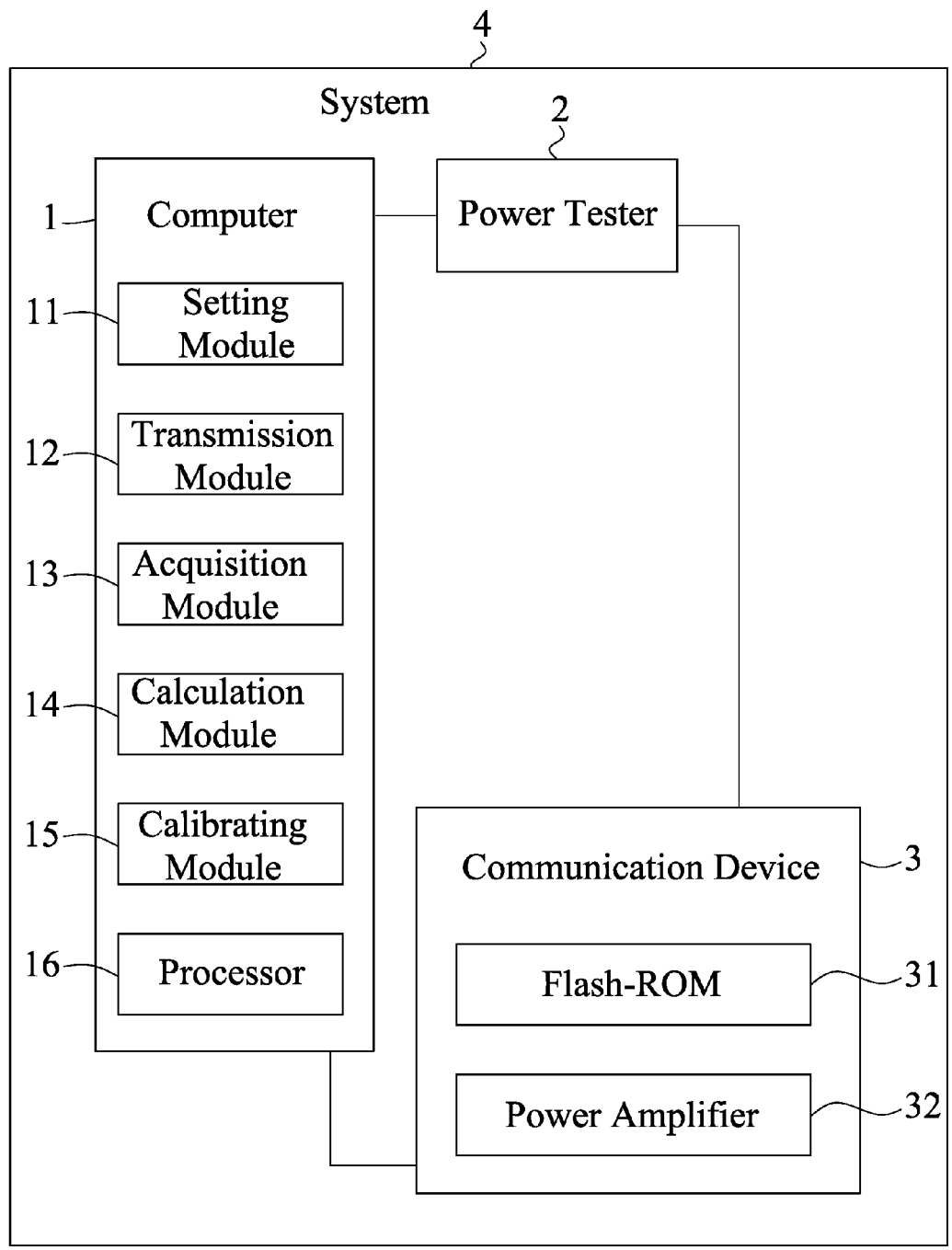
FIG. 2 is a block diagram of one embodiment of a system for automatically calibrating output power from a power amplifier of a communication device.

All of the processes described may be embodied in, and fully automated via, software code modules executed by one or more general purpose computers or processors as depicted in FIG. 2. The code modules may be stored in any type of computer-readable medium or other storage device. Some or all of the methods may alternatively be embodied in specialized computer hardware or communication apparatus.

FIG. 2 is a schematic diagram of one embodiment of a system 4 for automatically calibrating output power from a power amplifier of a communication device 3. The system 4 includes a computer 1, a power tester 2, and the communication device 3 electronically communicating with one another. In one embodiment, the power tester 2 communicates with the computer 1 via a general-purpose interface bus (GPIB), and to the communication device 3 via a radio frequency (RF) signal. In one embodiment, the communication device 3 communicates with the computer 1 via a Universal serial bus (USB) connection. In one embodiment, the communication device is a GPS console capable of communicating with other wireless apparatus via radio frequency signals in an ad-hoc network configuration. In other embodiments, the communication device is a mobile phone capable of communicating with base station via radio frequency signals in a wireless communication system.

The communication device 3 includes a Flash-ROM 31 and a power amplifier 32. The Flash-ROM 31 stores an auto-power calibration (APC) list. The APC list records APC values of different power grades and corresponding actual output power values of the power amplifier 32 of the communication device 3. In the embodiment of the present disclosure, the output power values of the power amplifier 32 is measured in Decibels per milliwatt (dBm), and the APC values are nominal. The power amplifier 32 changes output power of the communication device 3 according to the APC values in the APC list.

The power tester 2 tests the output power of the power amplifier 23 under different APC values as described and stored in the Flash ROM 31.

In one embodiment, the computer 1 includes a setting module 11, a transmission module 12, an acquisition module 13, a calculation module 14, a calibrating module 15, and a processor 16. The modules 11, 12, 13, 14, 15 may be used to execute one or more operations for the computer 1. Additionally, the computer 1 may comprise one or more specialized or general purpose processors, such as a processor 16 for executing the modules 11, 12, 13, 14, 15.

The setting module 11 is configured for setting a plurality of current APC values of the communication device 3 according to APC list stored in the Flash-ROM of the communication device 3. Depending on the embodiment, the setting module 11 sets the current APC values of the communication device 3 as either the maximum, the minimum and the median values in the APC list. In one example of an APC list, as illustrated in FIG. 1, the setting module 11 may set the current APC values of the communication device 3 as "759," "93," and "301" for the maximum, the minimum, and the median APC value, respectively. It may be understood that these APC values and corresponding output power values as illustrated in FIG. 1 are exemplary and may differ depending on the embodiment.

The transmission module 12 is configured for directing the power amplifier 32 to transmit RF signals to the power tester 2 after the setting module 11 sets the current APC values of the communication device 3.

The power tester 2 tests output power values of the power amplifier 32 according to different preset current APC values after receiving the RF signals from the power amplifier 32. In one embodiment, if the current APC value of the communication device 3 is configured as the maximum value of "759," the power tester 2 detects the output power value as "31.98 Decibels per milliwatt (dBm)" from the power amplifier 32. If the current APC value of the communication device 3 is configured as the minimum value of "93," the power tester 2 detects the output power value as "4.82 dBm" from the power amplifier 32. Additionally, if the current APC value of the communication device 3 is configured as the maximum value of "301," the power tester 2 detects the output power value as "18.96 dBm" from the power amplifier 23.

The acquisition module 3 is configured for acquiring the output power values of the power amplifier 32 from the power tester 2.

The calculation module 14 is configured for determining theoretical output power values corresponding to APC values in the APC list not equaling the preset current APC values. Depending on the embodiment, the calculation module 14 can carry out the calculation according to a mathematical formula of "APC=a*10^(power/c)+b," where "APC" is the APC value of the power amplifier of the communication device 3, "power" is the theoretical output power values of the power amplifier of the communication device 3 corresponding to the APC values, and "a," "b," and "c" are related parameters. The mathematical formula applied in the calculation module 14 is a simplified formula obtained from observation on the relationship between the APC values and actual power values of the power amplifier of the communication device. One exemplary example of determining theoretical output power values is detailed below.

Firstly, the calculation module 14 inputs three groups of data as (current APC value, output power value), such as (759, 31.98 dBm), (93, 4.82 dBm), and (301, 18.96 dBm), into the mathematical formula of "APC=a*10^(power/c)+b." The calculation module 14 then obtains three independent equations. Secondly, the values of "a", "b," and "c" may be obtained by simultaneously solving the three equations of the previous step. Thirdly, the calculation module 14 enters the values of "a," "b," and "c" into the mathematical formula of "APC=a*10^(power/c)+b," and obtains the theoretical output power values of the power amplifier 32 by entering other APC values not equaling the preset current APC values. As mentioned previously, due to individual physical characteristics of communication devices as manufactured, actual output power values differ from the theoretical output power values corresponding to the APC list. Therefore, for each communication device under this auto-power calibration process, the calculation module 14 will obtain different values of "a", "b," and "c." In addition, the calculation module 14 will obtain different theoretical output power values of the power amplifier 32 for each of the communication devices as well.

The calibrating module 15 is configured for automatically calibrating the actual output power values corresponding to the APC values in the APC list according to the theoretical output power values.

Figure 3:
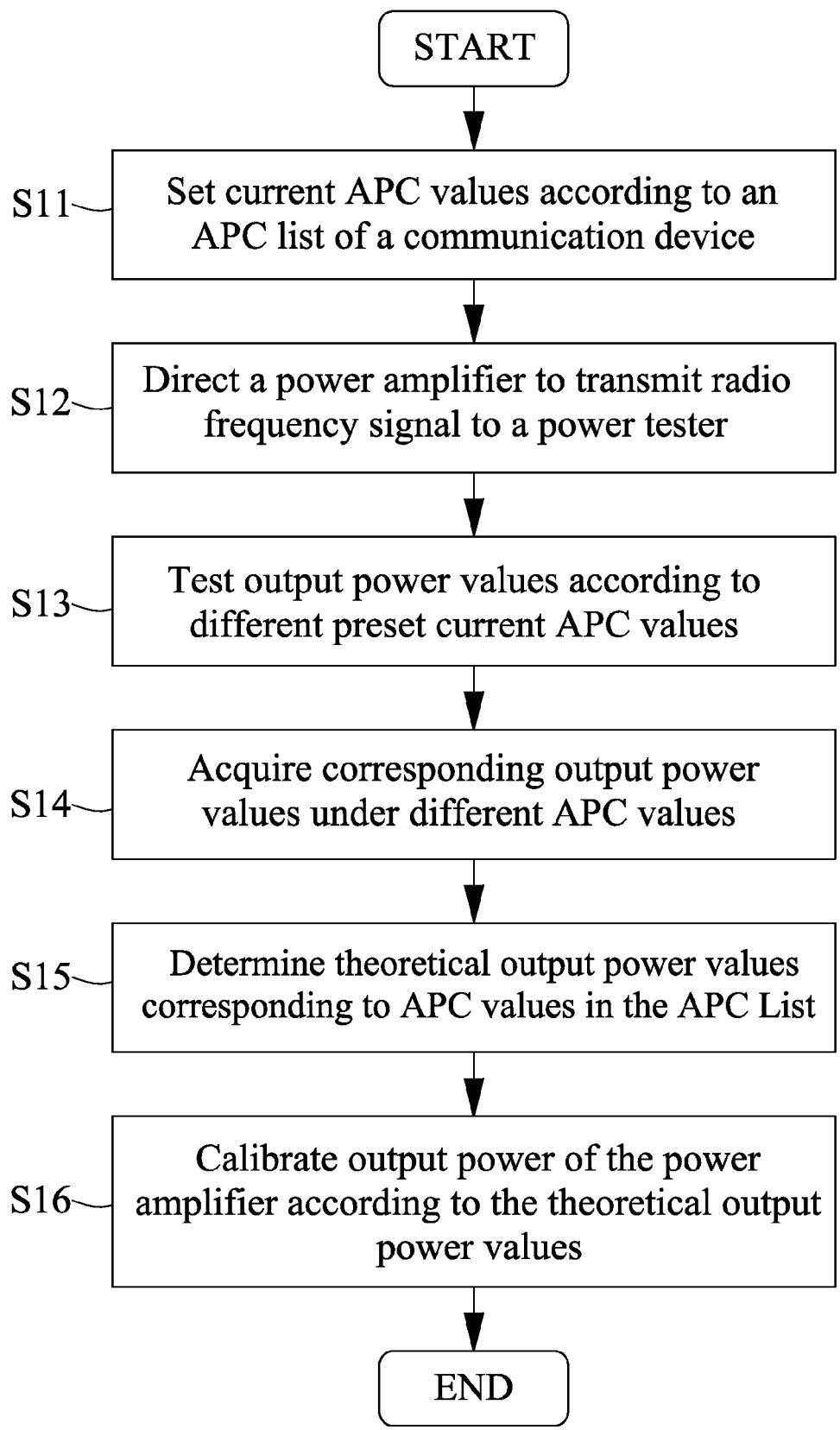
FIG. 3 is a flowchart of one embodiment of a method for automatically calibrating output power from the power amplifier of the communication device.

FIG. 3 is a flowchart of one embodiment of a method for automatically calibrating output power from the power amplifier of the communication device 3. Depending on the embodiment, additional blocks may be added, others deleted, and the ordering of the blocks may be changed. First, in block S11, the setting module 11 sets up multiple APC values of the communication device 3 according to the APC list thereon. In the embodiment of the present disclosure, the setting module 11 sets up the current APC values of the communication device 3 as having the maximum, the minimum, and the median values on the APC list.

In block S12, the transmission module 12 directs the power amplifier 32 to transmit radio frequency signals to the power tester 2 according to the preset current APC values of the communication device 3.

In block S13, the communication device 3 outputs radio frequency signals under different APC values. The power tester 2 then tests output power values of radio frequency signals from the communication device 3. For instance, when the current APC value of the communication device 3 is configured as the maximum value of "759," the power tester 2 should detect the output power value as "31.98 dBm" from the power amplifier 32. When the current APC value of the communication device 3 is configured as the minimum value of "93," the power tester 2 should detect the output power value as "4.82 dBm" from the power amplifier 32. Additionally, when the current APC value of the communication device 3 is configured as the maximum value of "301," the power tester 2 should detect the output power value as "18.96 dBm" from the power amplifier.

In block S14, the acquisition module 13 obtains the output power values of the power amplifier 32 from the power tester 2.

In block S15, the calculation module 14 calculates theoretical output power values from the power amplifier 32 of the communication device under APC values in the APC list not equaling the preset current APC values. In block S15, as described above, the calculation module 14 determines theoretical output power values corresponding to APC values in the APC list not equaling the preset current APC values.

In block S16, the calibrating module 15 automatically calibrates every actual output power value corresponding to the APC values on the APC list.

It should be emphasized that the above-described inventive embodiments are merely possible examples of implementations, and set forth for a clear understanding of the principles of the present disclosure. Many variations and modifications may be made to the above-described inventive embodiments without departing substantially from the spirit and principles of the present disclosure. All such modifications and variations are intended to be included herein within the scope of this disclosure and the above-described inventive embodiments, and the present disclosure is protected by the following claims.

What is claimed is:

1. A system for automatically calibrating output power from a power amplifier of a communication device, the communication device communicating with a power tester and a computer, the system comprising:
    a setting module configured for setting a plurality of current auto-power calibrate (APC) values of the communication device according to an auto-power calibrate (APC) list;
    a transmission module configured for directing the power amplifier to transmit radio frequency signals to the power tester;
    an acquisition module configured for acquiring output power values of the power amplifier from the power tester, wherein the power tester receives the radio frequency signals and tests the output power values according to different preset current APC values stored in the APC list;
    a calculation module configured for determining theoretical output power values corresponding to APC values in the APC list that are not equal to the preset current APC values by entering the preset current APC values and the output power values into a mathematical formula of "APC=a*10^(power/c)+b," wherein "APC" is the APC values of the power amplifier of the communication device, "power" is the output power values of the power amplifier of the communication device corresponding to the APC values, and "a," "b," and "c" are related parameters;
    acquiring values of the related parameters of "a," "b," and "c";
    inputting the values of "a," "b," and "c" into the mathematical formula of "APC=a*10^(power/c)+b";
    acquiring the theoretical output power values of the power amplifier corresponding to APC values in the APC list that are not equal to the preset current APC values;
    a calibrating module configured for calibrating actual output power values of the power amplifier corresponding to the APC values in the APC list according to the theoretical output power values; and
    at least one processor executing the setting module, the transmission module, the acquisition module, the calculation module, and the calibrating module to calibrate the output power from the power amplifier of the communication device.

2. The system as claimed in claim 1, wherein the setting module sets the current APC values as the maximum, the minimum, and the median APC values in the APC list.

3. The system as claimed in claim 2, wherein the power tester tests the output power values according to the maximum, the minimum and the median APC values in the APC list.

4. A method for automatically calibrating output power from a power amplifier of a communication device, the method comprising:
    providing electronic communication between the communication device with a power tester and a computer, wherein the communication device provides an APC list recording a plurality of current APC values of the communication device;
    setting a plurality of current APC values of the communication device according to the APC list;
    directing the power amplifier to transmit radio frequency signals to the power tester;
    acquiring output power values of the power amplifier from the power tester, wherein the power tester receives the radio frequency signals and tests the output power values according to different preset APC values;
    determining theoretical output power values corresponding to APC values in the APC list that are not equal to the preset current APC values by entering the preset current APC values and the output power values into a mathematical formula of "APC=a*10^(power/c)+b," wherein "APC" is the APC values of the power amplifier of the communication device, "power" is the output power values of the power amplifier of the communication device corresponding to the APC values, and "a," "b," and "c" are related parameters;
    acquiring values of the related parameters of "a," "b," and "c";
    inputting the values of "a," "b," and "c" into the mathematical formula of "APC=a*10^(power/c)+b";
    acquiring the theoretical output power values of the power amplifier corresponding to APC values in the APC list that are not equal to the preset current APC values; and
    calibrating the output power values corresponding to the APC values in the APC list according to the theoretical output power values.

5. The method as claimed in claim 4, wherein the setting step comprises setting the current APC values as the maximum, the minimum and the median APC values in the APC list.

6. The method as claimed in claim 5, wherein the testing step comprises testing the output power values according to the maximum, the minimum and the median values in the APC list.

* * * * *